Aug. 5, 1952        F. R. OGILVIE        2,605,904
OIL FILTER
Filed April 4, 1949
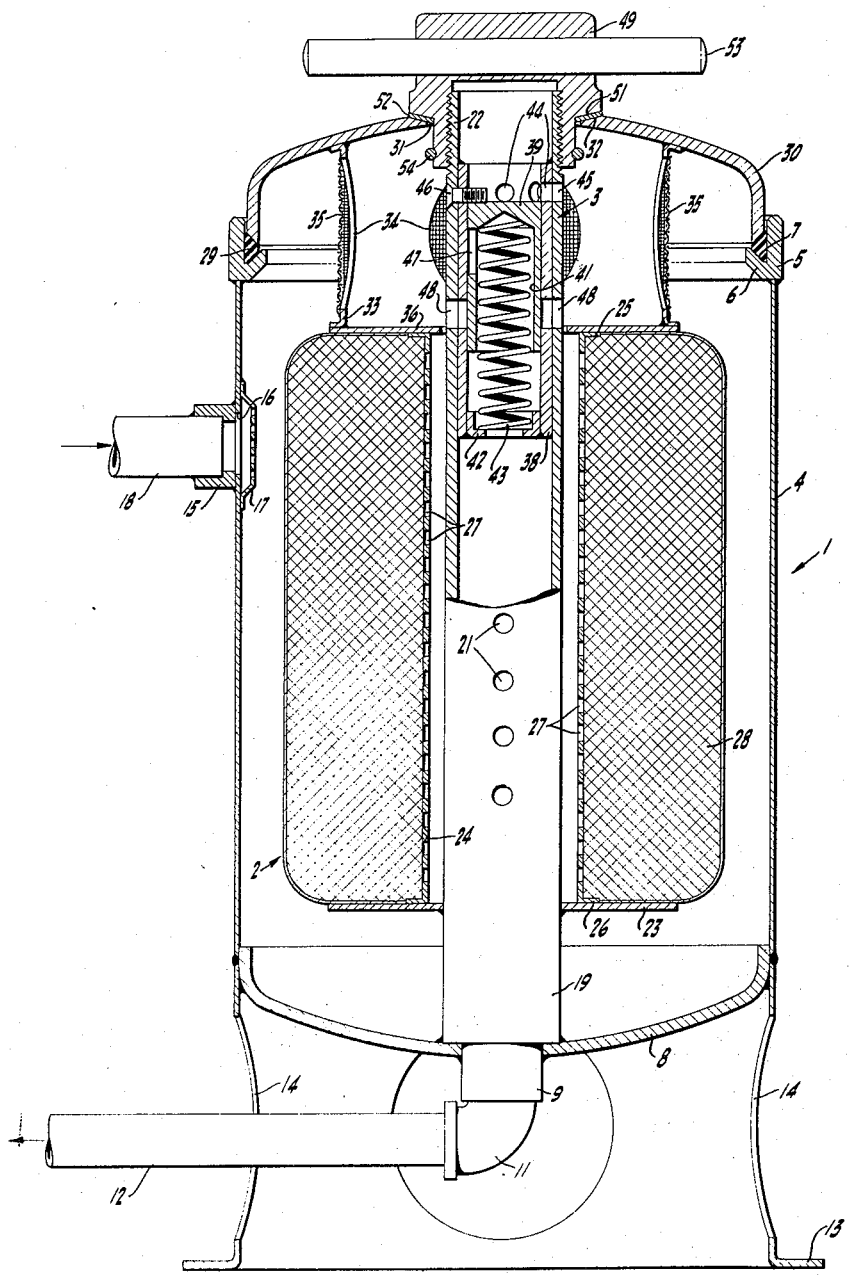
INVENTOR.
FRANK R. OGILVIE
BY
*Mellin + Hanscom*
ATTORNEYS Patented Aug. 5, 1952

2,605,904

UNITED STATES PATENT OFFICE 2,605,904

OIL FILTER

Frank R. Ogilvie, Glendora, Calif., assignor to Engine Life Products Corporation, El Monte, Calif., a corporation of California Application April 4, 1949, Serial No. 85,361

2 Claims. (Cl. 210—183)

This invention relates to and in general has for its object the provision of a filter of the character used for the filtration of crankcase oils, and wherein a slurry by-pass valve is incorporated in a filter unit including a filter cartridge mounted within a sealed casing in closed circuit with the crankcase of an engine.

More specifically, the object of this invention is the provision, in conjunction with a filter unit of the character above described, of a simply constructed piston type of by-pass valve incorporated within the filter unit and which serves to by-pass the oil entering the casing to its outlet in response to the existence of a predetermined differential pressure between the exterior and interior of the filter cell.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

The single figure shown in the accompanying drawing is a vertical mid-section of a crankcase oil filter embodying the objects of my invention.

In general, the filter unit illustrated in this figure includes a casing generally designated by the reference numeral 1, a filter cartridge generally designated by the reference numeral 2, and a piston type of by-pass valve associated with the casing and with the filter cartridge and generally designated by the reference numeral 3.

The filter casing 1 includes a cylindrical shell 4 having a ring 5 welded to its upper peripheral edge, the ring 5 being provided with an inwardly and upwardly inclined flange 6 forming a downwardly converging channel 7. Welded and sealed to the lower end of the shell 4 is a dished bottom or head 8 and welded to this head coaxially with the shell 4 is a threaded, downwardly extending filtrate outlet nipple 9. Threaded to the nipple 9 is an elbow 11 and threaded to the elbow is a pipe 12 for returning the filtered oil or other liquid to the crankcase of an engine or other receptacle. Welded to the lower end of the shell 4 and forming a downward continuation thereof is a bracket 13 provided with cut-outs 14, and serving as a means by which the filter unit can be mounted on an engine or other supporting structure. Welded to the shell adjacent its upper end is a threaded slurry inlet nipple 15 registering with an opening 16 formed in the shell. Welded to and within the shell over the opening 16 is a coarse screen 17. Threaded to the slurry inlet nipple 15 is a pipe 18 for connecting the filter unit to a source of oil or other liquid to be filtered.

Welded to the bottom or head 8 in vertical alignment with its nipple 9 is an upstanding filtrate tube 19 formed intermediate its ends with perforations 21 and provided with an upper threaded end 22. Welded to the filtrate tube 19 adjacent its lower end is an annular supporting plate 23 serving as a support for the cartridge 2.

The cartridge 2 includes a spool 24 provided with outwardly extending end flanges 25 and 26 and formed throughout its area with perforations 27. Mounted on the spool 24 is an annular body of filter medium 28 of any desired construction and texture, the lower end of the filter medium being in surface engagement with the upper face of the supporting plate 23.

Accommodated within the channel 7 of the ring 5 is a gasket 29 wedge-shaped in cross section and seated on this gasket is an upper casing head or cover 30 formed with a central opening 31 and with a spherical seat 32. Welded to and depending from the inner face of the cover 30 is a ring 33 circumscribing the upper end of the filtrate tube 19 and provided with peripherally spaced cut-outs 34. Sealed to the ring 33 over its cut-outs 34 are fine mesh drainage screens 35. Welded to the lower flanged edge of the ring 33 is an upper annular supporting plate 36, the lower face of this plate being in surface engagement with the upper end of the cartridge 2 thereby to prevent the passage of unfiltered oil between these two members.

The by-pass valve 3 includes a sleeve 38 disposed within the upper end of the filtrate tube 19 and welded thereto at its upper edge. Slidably disposed within the sleeve 38 is a piston cylinder 39 formed with an upwardly extending central bore 41 and closed at its upper end. Welded to the lower end of the sleeve 38 is an annular spring-supporting and stop member 42 and disposed within the piston cylinder 39 between its upper end and the stop member 42 is a spring 43. Formed in the upper end of the sleeve 38 and the filtrate tube 19 are a plurality of radially registering holes 44 and 45 respectively. One or more of the holes 45 can be threaded for the reception of a screw 46 serving to limit the upward movement of the piston cylinder 39, the limit of the downward movement of this piston being determined by the upwardly extending flange of the stop member 42. Formed in the piston cylinder 39 adjacent its upper end are a plurality of openings 47 arranged to be brought into registration with peripherally aligned openings 48 formed in the upper end of the tube 19 and sleeve 48 when the piston cylinder is in its lowermost position as determined by the stop member 42.

Threaded over the upper end of the filtrate tube 19 is a nut 49 provided intermediate its ends with a downwardly convex spheroidal shoulder 51 complementary to the spheroidal seat formed in the cover 30. Receivable in the seat 32 is a gasket 52 for sealing the nut 59 to the cover 30 when the nut is screwed home. In addition to or as a substitute for the usual wrench faces provided on a nut, the nut 49 may be provided with a wrench rod 53. For ease in the assembly of this device a wire ring 54 is clipped to the lower threaded end of the nut 49, this ring serving to loosely interlock the nut to the cap 30.

During the operation of this unit, unfiltered oil or other slurry entering the unit through the inlet nipple 15 must pass through the unit either by way of the filter medium 28 or by way of the fine mesh drainage screen 35. Normally, the bulk of the oil passes through the filter medium, rather than through the coarser drainage screens 35, for the surface area of the filter medium is far greater than the surface area of the screens. The oil passing through the filter medium and through the perforations of the spool 27 enters the filtrate tube 19 through its perforations 21 and passes out of the unit through the slurry outlet 9 and the filtrate pipe 12. When, however, the outer surface of the filter medium becomes plugged or blinded, the slurry will take the path of least resistance through the drainage screens 35, a portion of such oil passing through the registering openings 44 and 45 formed in the filtrate tube 19 and its associated sleeve 38. That portion of the tube 19 above the piston cylinder 39 will therefore always be subjected to substantially the pressure of the slurry disposed within the shell 4 and external to the filter cartridge 2. When the slurry pressure has been built up to a predetermined selected value, it will move the piston cylinder 39 downwardly against the biasing action of the spring 43 and bring its openings 47 into registration with the openings 48 formed in the tube 19 and the sleeve 38. Upon such registration of these openings, the slurry strained by passing through the screens 35 will be by-passed directly through the piston valve into the tube 19 and through the tube 19 out of the filter unit.

From the above description it will be seen that I have provided a positively acting and simply constructed by-pass valve in conjunction with a filter unit whereby when the filter medium of the unit becomes plugged or blinded the incoming oil will be by-passed to the outlet of the unit.

I claim:

1. A filter comprising: a filter casing including opposed end members and provided with a slurry inlet and a filtrate outlet; a tube extending across and sealed to said opposed end members with one end thereof in open communication with said filtrate outlet; a cylindrical filter cartridge surrounding said tube and communicating with the interior thereof through holes formed in said tube within the length of said cartridge; a filter screen surrounding said tube and extending from the end member opposite the filtrate outlet to the filter cartridge; a spring biased piston valve disposed within said tube where said tube is surrounded by said filter screen, the inner end of said piston valve being in open communication with said filtrate outlet through said tube and its outer end being closed, said tube and said piston valve being provided with normally non-registering ports and said tube being formed with a port outward of the outer end of said piston valve and which serves to subject the outer end of said piston to slurry pressure within said casing and external to said cartridge.

2. A device of the character described comprising a casing having a slurry inlet formed therein, a base member secured to and sealing the bottom of said casing, said base member having a filtrate outlet formed therein, a tube connected to said filtrate outlet and extending longitudinally with said casing, a top member threadably receivable on the upper end of said tube and sealing the upper end of said casing, a primary filter cartridge surrounding said tube and communicating with the interior thereof through holes formed in said tube within the length of said cartridge, a secondary filter screen surrounding said tube and extending between said primary filter cartridge and said top member, whereby when said primary filter becomes plugged said slurry passes through said secondary filter screen and into communication with said tube above said filter cartridge, a spring biased piston valve disposed within said tube where said tube is surrounded by said secondary filter screen, the face of said piston being in open communication to the external pressure on said tube, the interior of said piston being in open communication with the interior of said tube, said tube and the side wall of said piston valve having normally non-registering ports, whereby the external pressure on said piston causes said piston to so move as to align said normally non-registering ports, whereby the filtrate which has passed through said secondary filter screen flows into and through said tube and out through said filtrate outlet.

FRANK R. OGILVIE.

REFERENCES CITED

The following references are of record in the file of this patent:

UNITED STATES PATENTS

| Number | Name | Date |
|---|---|---|
| 1,406,216 | Olson | Feb. 14, 1922 |
| 2,156,329 | Beck | May 2, 1939 |
| 2,342,948 | Long | Feb. 29, 1944 |
| 2,454,030 | Besore | Nov. 16, 1948 |
| 2,478,109 | Kamrath | Aug. 2, 1949 |
| 2,533,266 | Kovacs et al. | Dec. 12, 1950 |